United States Patent [19]
Masuda et al.

[11] Patent Number: 5,341,388
[45] Date of Patent: Aug. 23, 1994

[54] LASER LIGHT BEAM GENERATING APPARATUS

[75] Inventors: Hisashi Masuda; Yushi Kaneda, both of Kanagawa, Japan

[73] Assignee: Sony Corporation, Japan

[21] Appl. No.: 15,361

[22] Filed: Feb. 9, 1993

[30] Foreign Application Priority Data

Feb. 20, 1992 [JP] Japan ................................. 4-033754
Feb. 21, 1992 [JP] Japan ................................. 4-072515

[51] Int. Cl.⁵ ...................... H01S 3/045; H01S 3/094
[52] U.S. Cl. ........................................ 372/36; 372/34; 372/75
[58] Field of Search .................. 372/34, 36, 75, 92, 372/105, 106, 108

[56] References Cited

U.S. PATENT DOCUMENTS

| | | | |
|---|---|---|---|
| 4,749,842 | 6/1988 | Kane et al. | 219/201 |
| 4,847,851 | 7/1989 | Dixon | 372/75 |
| 5,181,214 | 1/1993 | Berger et al. | 372/36 |

FOREIGN PATENT DOCUMENTS 0336665 10/1989 European Pat. Off. .
0457590 11/1991 European Pat. Off. .
0514758 11/1992 European Pat. Off. .
4893784 11/1973 Japan .
2222907  3/1990 United Kingdom .

*Primary Examiner*—James W. Davie
*Attorney, Agent, or Firm*—Ronald P. Kananen

[57] ABSTRACT

A laser light beam generating apparatus includes a laser diode, a laser medium, a non-linear optical crystal element, reflecting mirrors, a deflecting mirror, a temperature-control device and a case. The laser diode emits at least one pumping laser light beam. The laser medium is excited by the pumping laser light beam from the laser diode. The non-linear optical crystal element is arranged in outputted light path of the pumping laser light beam from the laser diode. The reflecting mirrors constitute a resonator with the laser medium and the non-linear optical crystal element. The deflecting mirror deflects the light path of the light beam from the resonator. The temperature-control device controls the temperature of the laser diode and the resonator. The case houses the laser diode, the laser medium, the non-linear optical crystal element, the reflecting mirrors, the deflecting mirror, and the temperature-control device.

23 Claims, 6 Drawing Sheets

LASER LIGHT BEAM GENERATING APPARATUS

BACKGROUND OF THE INVENTION

1. Field of the Invention

The present invention relates to a laser light beam generating apparatus. More particularly, the present invention relates to a laser light beam generating apparatus producing a laser light beam wavelength-converted by a non-linear optical crystal device.

2. Background of the Invention

In Japanese Laid-Open Utility Model Publication No. 48-93784 for example, a laser light beam generating apparatus utilizing an efficient wavelength conversion such as second harmonics generation (SHG) is disclosed. The laser light beam generating apparatus emits a short wavelength laser light beam or a wavelength-converted laser light beam by a non-linear optical crystal device and uses a laser light beam of fundamental frequency with high power density within a laser resonator.

A conventional laser light beam generating apparatus utilizing the efficient wavelength conversion includes a light beam source and a resonator having a laser medium and a non-linear optical device element. At least one pumping light beam emitted from the light beam source is irradiated to the laser medium of the resonator. The laser medium is excited by the pumping light beam and generates a laser light beam of fundamental frequency. The laser light beam of fundamental frequency generated from the laser medium is irradiated to the non-linear optical device element. As a result, a SHG laser light beam is generated from the non-linear optical crystal device and outputted from the resonator.

For assembling and using the laser light beam generating apparatus utilized the efficient wavelength conversion in various equipment, such as an optical disc recording and/or reproducing apparatus or other like, it is desirable that optical elements necessary for the SHG laser light beam emission be housed within a small-sized case for facilitated handling as a component.

In general, for stably obtaining an SHG laser light beam with high efficiency in the above mentioned laser light beam generating apparatus, it is necessary that the pumping light beam from the light beam source such as a laser diode is efficiently absorbed in the laser medium such as Nd:YAG. It is also necessary that temperature is controlled within a limited range allowing stable operation with little noise, for such reason as changes in temperature dependence of the phase delay quantity and longitudinal mode of the non-linear optical crystal device of the resonator. For pumping light beam to be efficiently absorbed in the laser medium, it is necessary to adjust the wavelength of the laser medium, and since the wavelength of the pumping light beam changes in accordance with the temperature of the light beam source such as the laser diode, it is necessary to temperature-control the light beam source.

Since it is thus necessary to perform temperature control of the resonator and the light beam source, two systems of temperature-control and two systems of temperature detection are necessary, thereby complicating the construction and consequently causing a problem of increasing power consumption. In particular, in a laser light beam generating apparatus including the optical elements for laser light beam emission and temperature-control device housed in a small-sized case, when the light beam source and resonator are each arranged on a separate temperature-control device, adjustment of the positions of the light beam source and the resonator to each other becomes difficult, as their relative position shifts in accordance with changes in temperature, thereby causing a problem of unstable operation.

On the other hand, when a laser light beam generating apparatus utilizing the efficient wavelength conversion, having an SHG laser light beam emitting optical system housed within a small-sized case, is to be assembled into various equipment, such as an optical disc recording and/or reproducing apparatus, it is necessary to perform so-called optical axis matching, which operation preferably may be performed without excessive difficulties. The optical axis matching is carried out by fine adjustment in two perpendicular directions on a surface perpendicular to the optical axis. However, the devices of the SHG laser light beam generating optical system are arranged in a direction parallel to the bottom surface of the case such as a horizontal surface, with the direction of the optical axis being parallel to the bottom surface of the case as the horizontal surface. Since the bottom surface as the horizontal surface is usually attachment surface of the laser light beam generating apparatus, one of the two perpendicular directions for optical axis matching is perpendicular to the attachment surface. Because of the perpendicular movement relative to the attachment surface of the case, the arrangement for fine adjustment operation become troublesome while it is difficult to raise operating accuracy.

SUMMARY OF THE INVENTION

It is, therefore, an object of the present invention to provide a laser light beam generating apparatus which resolves the above mentioned problems.

It is another object of the present invention to provide a laser light beam wherein temperature control for stable laser light beam emission with high efficiency may be performed by a simple configuration and with a small amount of power consumption, A further object of the invention is to provide a laser light beam generating apparatus in which various components for generating a laser light beam are built in a package, in which fine adjustment for optical axis matching may be performed easily to improve the operation accuracy.

According to a first embodiment of the present invention, there is provided a laser light beam generating apparatus including a laser diode, a laser medium, a non-linear optical crystal element, reflecting mirrors and a temperature-control device. The laser diode emits at least one pumping laser light beam. The laser medium is excited by the pumping laser light beam from the laser diode. The non-linear optical crystal element is arranged in outputted light path of the pumping laser light beam from the laser diode. The reflecting mirrors constitute a resonator with the laser medium and the non-linear optical crystal element. The temperature-control device controls the temperature of the laser diode and the resonator, According to a second embodiment of the present invention, there is provided a lasers light beam generating apparatus including a laser diode, a laser medium, a non-linear optical crystal element, reflecting mirrors, a deflecting mirror and a case. The laser diode emits at least one pumping laser light beam. The laser medium is excited by the pumping laser light beam from the laser diode. The non-linear optical crystal element is arranged in outputted light path of the pumping laser light beam from the laser diode. The reflecting mirrors constitute a resonator with the laser medium and the non-linear optical crystal element. The deflecting mirror deflects the light path of the light beam from the resonator. The case houses the laser diode, the laser medium, the non-linear optical crystal element, the reflecting mirrors, and the deflecting mirror.

In the above-described invention, a single temperature-control device controls the light beam source and the resonator, so as to produce the stable laser light beam output with high efficiency, thereby realizing simplification of structure and reduction in size and in power consumption.

In the above-described invention, since the laser light beam is taken out of the case by deflecting the optical axis of the resonator and the light beam source arranged in the case, the laser light beam may be radiated perpendicularly to the attachment surface of the case to facilitate fine adjustment of the mounting position within the attachment surface and to facilitate optical axis matching.

BRIEF DESCRIPTION OF THE DRAWING

The invention will be more readily understood with reference to the accompanying drawing, wherein.

DESCRIPTION OF THE INVENTION

Figure 1:
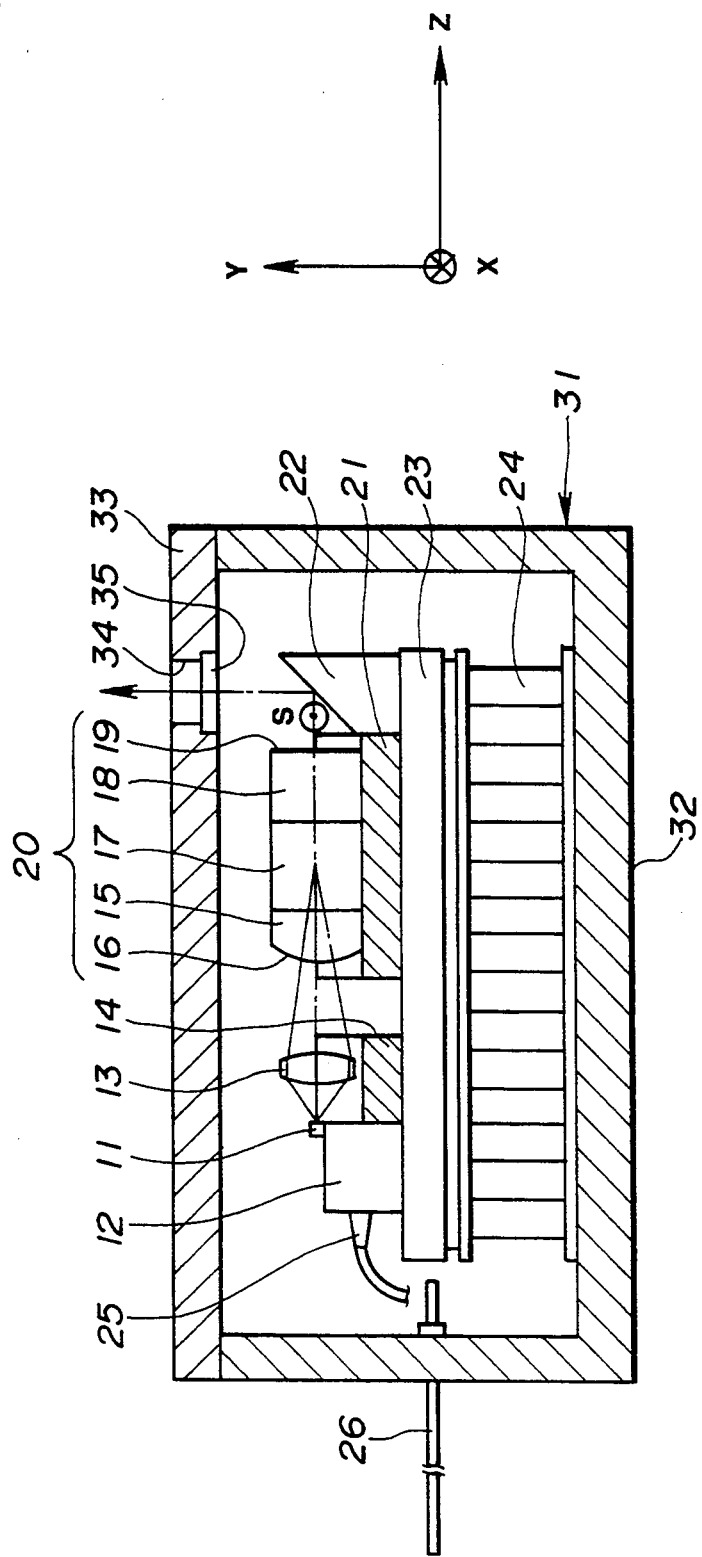
FIG. 1 is a cross-sectional side view showing a schematic arrangement of a first embodiment of a laser light beam generating apparatus according to the present invention.

Referring to the drawings, the preferred embodiments of the present invention will be explained in detail.

Figure 2:
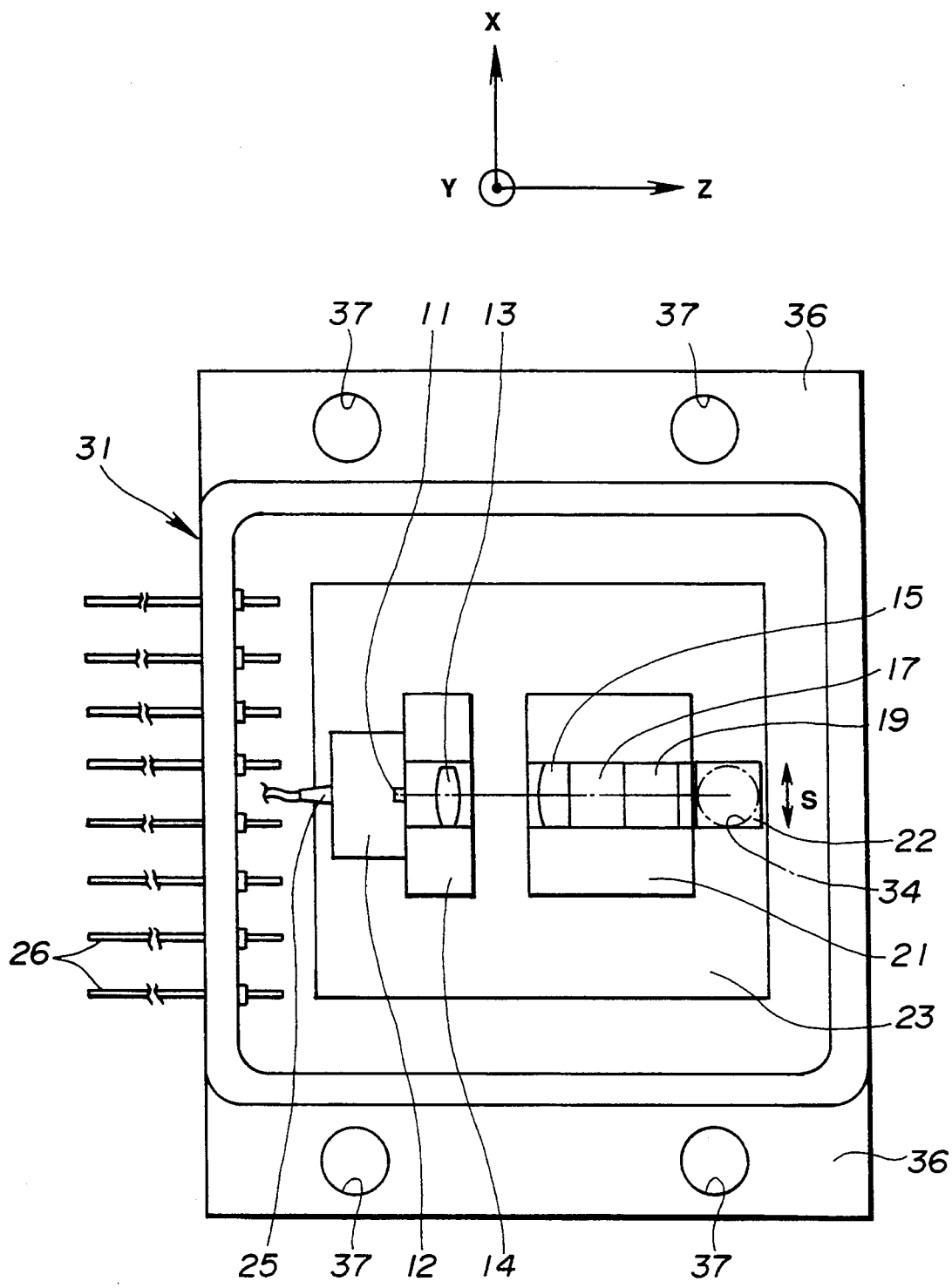
FIG. 2 shows a schematic plan view of the laser light beam generating apparatus of the present invention, with a lid removed.

FIG. 1 is a schematic cross-sectional view showing a schematic arrangement of a laser light beam generating apparatus according to a first embodiment of the present invention. FIG. 2 is a schematic plan view showing the apparatus shown in FIG. 1 with a lid removed.

The laser light beam generating apparatus, shown in FIGS. 1 and 2, includes a semiconductor laser element 11, a lens 13, a ¼ wavelength plate 15, reflecting surfaces 16, 19, a laser medium 17, a non-linear optical crystal device 18, a deflecting mirror 22, a base 23, a temperature-control device 24, a thermistor 25 and a package or a case 31. The semiconductor laser element 11, such as a laser diode, is a light beam source and is mounted on a setting table 12. The lens 13 for focusing a light beam as a pumping light beam emitted from the semiconductor laser element 11 is mounted on a lens mounting block 14. The reflecting surface 16, such as a dichroic mirror, has a wavelength selectivity transmitting the pumping laser light beam with a wavelength of, for example, 810 nm and reflects the laser light beam of fundamental frequency of 1064 nm produced in the laser medium 17. The reflecting surface 16 is formed on the incident surface of the ¼ wavelength plate 15 by coating. In the embodiment illustrated, the reflecting surface 16 is in the form of a concave mirror if seen from the side laser medium 17. The laser medium 17 is made of Nd:YAG and is a rod-shaped laser medium. The laser medium 17 may be exemplified by Nd:YVO4, Nd:BEL or LNP. The non-linear optical crystal device 18 is made of KTP (KTiOP04) to generate second high harmonics (SHG). The non-linear optical crystal device 18 may be exemplified by BBO, LN or LBO. The reflecting surface 19, such as a dichroic mirror, has wavelength selectivity reflecting the laser light beam of fundamental frequency and transmitting the laser light beam of the second harmonics of 532 run generated by the non-linear optical crystal device 18. The reflecting surface 19 is formed on the outgoing surface of the non-linear optical crystal device 18. As a result, a resonator 20 is provided between the reflecting surface 16 of the ¼ wavelength plate 15 and the reflecting surface 19 of the non-linear optical crystal device 18. In this laser light beam generating apparatus, the pumping laser light beam focused by the lens 13 is irradiated to the laser medium 17 via the incident surface of the ¼ wavelength plate 15. The laser medium 17 is excited by the pumping laser light beam and generates the laser light beam of fundamental frequency. The laser light beam of fundamental frequency is irradiated to the non-linear optical crystal device 18. As a result, the laser light beam of a second harmonic of 532 nm is generated by the non-linear optical crystal device 18.

It is noted that the ¼ wavelength plate is a birefringence element which is employed in a laser light source as proposed by the present applicant in U.S. Pat. No. 4,910,740 for stabilizing the laser light beam of second harmonics radiated as an output laser light beam. That is, since the laser light beam of fundamental frequency, generated in the laser medium 17, is caused to perform a resonating movement so as to pass through the non-linear optical crystal element 18 provided in the resonator 20 to generate a type II second high harmonic laser light beam, the plane of polarization of the laser light beam of fundamental frequency is rotated by the birefringence element, such as the ¼ wavelength plate 15, inserted in the resonator 20, for establishing two perpendicular inherent polarized light beams as a fundamental wave mode. Besides, by selecting the values of the azimuthal angle and the phase quantity Δ of the ¼ wavelength plate 15 so as not to produce energy exchange between the two inherent polarized light beams of the laser light beam of fundamental frequency in the course of generation of the second high harmonics, it becomes possible to stabilize the laser light beam of fundamental frequency and hence the laser light beam of the second high harmonics. On the other hand, by integrating the ¼ wavelength plate 15, the laser medium 17 and the type II phase matched type non-linear optical crystal device 18 being in intimate contact with one another, the laser light beam generating apparatus may be reduced in size in its entirety, while the conversion efficiency may be improved.

Figure 3:
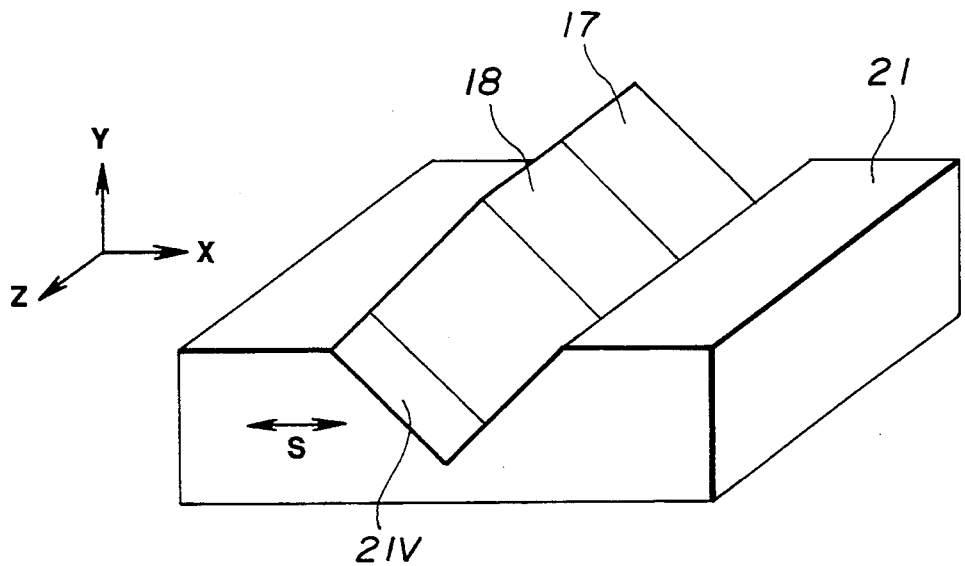
FIG. 3 shows a perspective view of an example of a resonator mounting block of the present invention.

Each of the surfaces of the ¼ wavelength plate 15, the laser medium 17 and the non-linear optical crystal device 18 constituting the resonator 20 are coated by an anti-reflection coating and adhered in intimate contact with another. The resonator 20 is mounted on a resonator mounting block 21. The mounting block 21 are formed a V-shaped groove 21V, as shown in FIG. 3. The ¼ wavelength plate 15, the laser medium 17 and the non-linear optical crystal device 18 is guided by the groove 21V and mounted on the mounting block 21. The non-linear optical crystal device 18 is arranged so that, with the direction shown by an arrow Z as an optical axis, the direction of the polarization of the outgoing light beam of the second harmonics is the direction shown by a double-headed arrow S or an arrow X in FIG. 3. To this end, KTP as the non-linear optical crystal device 18, if used, needs only be cut so that the XY plane contains the a-axis and the b-axis of the crystal and the Y-axis normal thereto is a c-axis of the crystal. This direction of the polarization is the direction of S-polarization of the deflecting mirror 22. The laser light beam of the second harmonics radiated from the resonator 20 is deflected in a vertically upward direction by the deflecting mirror 22. The deflecting angle of the deflecting mirror 22 is 45°. The deflecting mirror 22, the mounting block 21 mounting the resonator 20, the mounting block 14 mounting the lens 13 and the setting table 12 mounting the semiconductor laser element 11 are mounted on the same base 23. These elements are temperature-controlled in their entirety by the temperature-controlling device 24 such as a so-called thermo-electric (TE) cooler. The thermistor 25 for detecting the temperature of the upper surface region of the base 23 is mounted on the setting table 12.

Next, the temperature-control device 24 such as the TE cooler is explained. In this first embodiment, wavelength control of the semiconductor laser element emitting the pumping light beam and temperature-control for stabilizing the resonator 20 are carried out by the single temperature-control device or the TE cooler 24. When the stable temperature range of the resonator 20 and the temperature range within which the pumping light beam may be efficiency absorbed in the laser medium 17 exist separately and are narrow, it is necessary to select the semiconductor laser element 11 producing a wavelength whereby the absorption coefficient of the laser medium 17 such as Nd:YAG exceeds a predetermined value within the temperature range for the stable region for the resonator 20. It is also possible to select the resonator instead. Also, for enlarging the stable temperature range for the resonator 20, it is effective to curtail the length of the birefringent crystal of which the phase delay quantity has temperature dependence, or to employ a crystal having low temperature dependence. The temperature-control is the following operation. That is, the thermistor 25 or the temperature detection device detects the temperature on the base 23, particularly the temperature of the non-linear optical crystal device 18 within the resonator 20 and the semiconductor laser element 11. In accordance with the temperature detected by the thermistor 25, the temperature-control device or the TE cooler 24 controls heating and heat absorption, thereby achieving a predetermined target temperature.

As a result, since the single temperature control device 24 adjusts the wavelength of the semiconductor laser element 11 to the absorption wavelength, so as to perform temperature-control for stabilizing the resonator 20, the temperature-control devices are not required to be provided separately for each part, and therefore, inconvenience such as complication of structure due to the presence of two or more temperature-control devices and difficulty in positioning of the temperature-control devices may be overcome entirely. Accordingly, reduction in the number of component parts and costs, simplification of the controlling part including circuits, and reduction in size and power consumption may be realized.

The above-described devices for laser light emission are housed within a package or a case 31. The package or the case 31 has a bottom surface 32 as an attachment surface which may be secured to a mounting flange 36 by setting screws etc. threaded into tapped holes 37 formed in the mounting flange 36, as shown in FIG. 2. The above-described devices 11, 13, 15, 17 and 18 are arrayed in a direction parallel to the bottom surface 32 as the horizontal surface. If the laser light beam is taken out of the case 31 in a direction parallel to the bottom surface 32 as the horizontal surface, it becomes necessary to cause movement in both the horizontal and vertical directions for optical axis matching, in which the mechanism for causing vertical movement relative to the attachment surface becomes complicated. In order to avoid this, the laser light beam outgoing from the resonator 20 is deflected by the deflecting mirror 22 having a tilt angle of 45 in a direction normal to the bottom surface 32 so as to be taken out via an outgoing opening 34 formed in a lid 33 of the case 31. The opening 34 is closed by a transparent plate 35.

The deflectance of the deflecting mirror 22 having a tilt angle of 45° can be readily raised for S-polarized light beam. However, it cannot be raised for the P-polarized light beam. Above all, if the incident light beam is composite of the S-polarized light beam component and the P-polarized light beam component, mixed together, the reflected light beam becomes an elliptically polarized light beam, which is difficult to control. Because the reflectance of the S-polarized light beam and the reflectance of the P-polarized light beam is different. Thus, in the present embodiment, the azimuth of the non-linear optical crystal device 18 like KTP is set with respect to its outer shape, by setting the cutting shape of the crystal, so that the direction of polarization of the SHG laser light beam radiated from the non-linear optical crystal device 18 is coincident with the direction of S-polarization of the deflecting mirror 22. In this case, the reflectance of the S-polarization may be raised to, for example, 99.9%, by applying a coating on the surface of the deflecting mirror 22, to reduce power losses to as low a value as possible. The SHG laser light beam may be taken out vertically upwardly via outgoing opening 34 in the lid 33 of the case 31.

In the small-sized compact SHG laser light beam generator shown in FIGS. 1 and 2, the size of the bottom surface of the case 31 to include the flange 36 is about 38 mm×28 m/n, with the height of the case being equal to about 16 mm. Within this case 31, the semiconductor laser element 11, the resonator 20 made up mainly of the laser medium 17 and the non-linear optical crystal device 18, the lens 13, temperature control device 24 are mounted in position. As a result, the SHG laser light beam may be radiated by simply supplying electric power from outside to the laser generating apparatus. The SHG laser emitting unit has a length shorter than the oscillating wavelength of the existing semiconductor laser element at ambient temperature so that stable short wavelength laser light beam may be advantageously produced by supplying the electric current thereto, similarly to the semiconductor laser element.

With the above-described laser light beam generating apparatus as SHG laser light beam generating apparatus, since the direction of polarization of the non-linear optical crystal device 18 is coincident with the direction of S-polarization of the deflecting mirror 22, it becomes possible to raise the reflectance of the deflecting mirror 22 with respect to the S-polarized light beam. Besides, the SHG laser light beam taken out at the outgoing opening 34 after reflection is not polarized elliptically, with the direction of polarization being constant. Since the direction of polarization of the outgoing light beam is determined with respect to the case, the apparatus may be handled easily, while it can readily be built into an optical disc recording and/or reproducing apparatus. Since the outgoing light beam is taken out vertically upwardly, that is in the Y-direction shown in FIG. 1, an adjustment operation such as optical axis matching needs to be carried out by fine adjustment in two directions (X- and Z-directions as shown in FIG. 1) on the case mounting surface with resulting increase in adjustment accuracy.

Meanwhile, the configuration without employing the deflecting mirror 22 is possible. For instance, the SHG laser light beam may be taken out in a horizontal direction, as in a second embodiment of the present invention as shown in FIG. 4.

Figure 4:
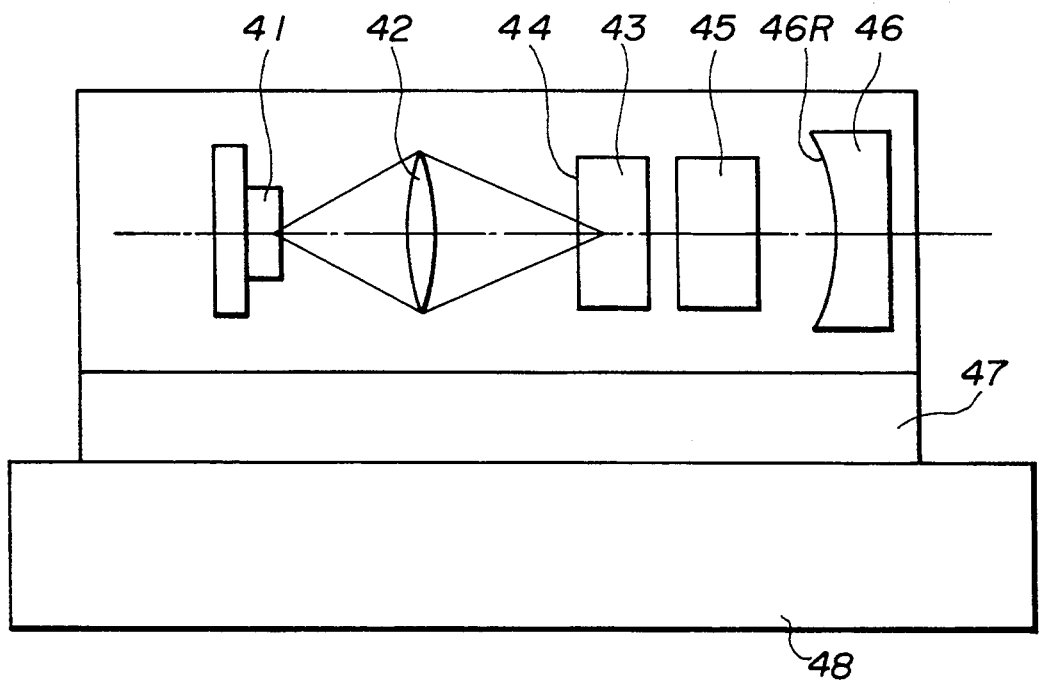
FIG. 4 shows a schematic arrangement of a second embodiment of a laser light beam generating apparatus according to the present invention.

In the second embodiment of FIG. 4, a laser light beam generating apparatus includes a laser diode 41, a lens 42, a laser medium 43, reflecting surfaces 44, 46R, a non-linear optical crystal device 45, a concave mirror 46, a temperature control device 47 and a radiating plate 48. The laser diode 41 is a light beam source emitted at least one pumping light beam. The lens 42 focus the pumping light beam from the laser diode 41. The laser medium 43 is a rod-like Nd:YAG and is excited by the pumping light beam and generates a laser light beam of fundamental frequency. The wavelength of the laser light beam of fundamental frequency, for example, is 1064 nm. The reflecting surface 44, such as a dichroic mirror, is coated on the incident surface of the laser medium 43. The reflecting surface 44 has selectivity of transmitting the pumping light beam with the wavelength, for example, 810 nm and reflecting the laser light beam of fundamental frequency generated in the laser medium 43, as is on the above mentioned reflecting surface 16 formed on the ¼ wavelength plate 15. The non-linear optical crystal device 45 is KTP (KTiOPO4) and carries out the second harmonic generation (SHG). The concave mirror 46 has the reflecting surface 46R, such as a dichroic mirror, which has selectivity of transmitting the SHG laser light beam with the wavelength, for example, 532 nm and reflecting the laser light beam of fundamental frequency, thereof wavelength is 1064 nm, generated in the laser medium 43. The single temperature-control device 47, such as a TE cooler, control the temperature of the laser diode 41 and the resonator constituted with the laser medium 43, the non-linear optical crystal device 45 and the reflecting surfaces 44, 46R. The temperature-control device 47 is provided on the radiation plate 48. The pumping light beam radiated from the laser diode 41 is focused on the laser medium 43 via the reflecting surface 44. The laser medium 43 is excited by the pumping light beam and generates the laser light beam of fundamental frequency. The laser light beam of fundamental frequency is irradiated to the non-linear optical crystal device 45. The non-linear optical crystal device 45 generates the SHG laser light beam. Since, the detail of operation and effects of the second embodiment are as in the first embodiment, explanation of the operation and effects are omitted.

Next, a temperature-controlling operation for maintaining stability of the SHG laser light beam generating apparatus while improving its efficiency is explained in detail. In the embodiments of the present invention, the single temperature control device such as the TE cooler temperature-controls the light source such as the semiconductor laser element or the laser diode and the resonator simultaneously, so as to generate the stable SHG laser light beam with little noise and without reduction in power, thereby realizing the reduction in the number of component parts and power consumption, and improvement of reliability. Meanwhile, among the laser media, there is a medium having a relatively narrow and sharp peak such as Nd:YAG as well as a medium relatively wide in absorption wavelength region such as Nd:Glass.

It is assumed that the present invention is applied to the laser light beam generating apparatus employing the laser medium having a relatively narrow absorption line.

The resonator 20 generated the SHG laser light beam as shown in FIGS. 1 and 2, including the non-linear optical crystal device 18 therein, has the stable operation region of the limited temperature range due to changed in temperature dependency of phase delay quantity and longitudinal mode and transformation of the resonator. For obtaining power efficiency higher than a predetermined value within the stable operation region of the resonator, it is necessary to select the semiconductor laser element 11 of which the wavelength may be absorbed in the laser medium 17 in a good condition within the stable region. It is also possible to select the resonator 20 instead. For enlarging the stable operation temperature range for the resonator 20, it is effective to curtail the length of a birefringent crystal of which the phase delay quantity has temperature dependence, or to employ a crystal having low temperature dependence.

Figure 5:
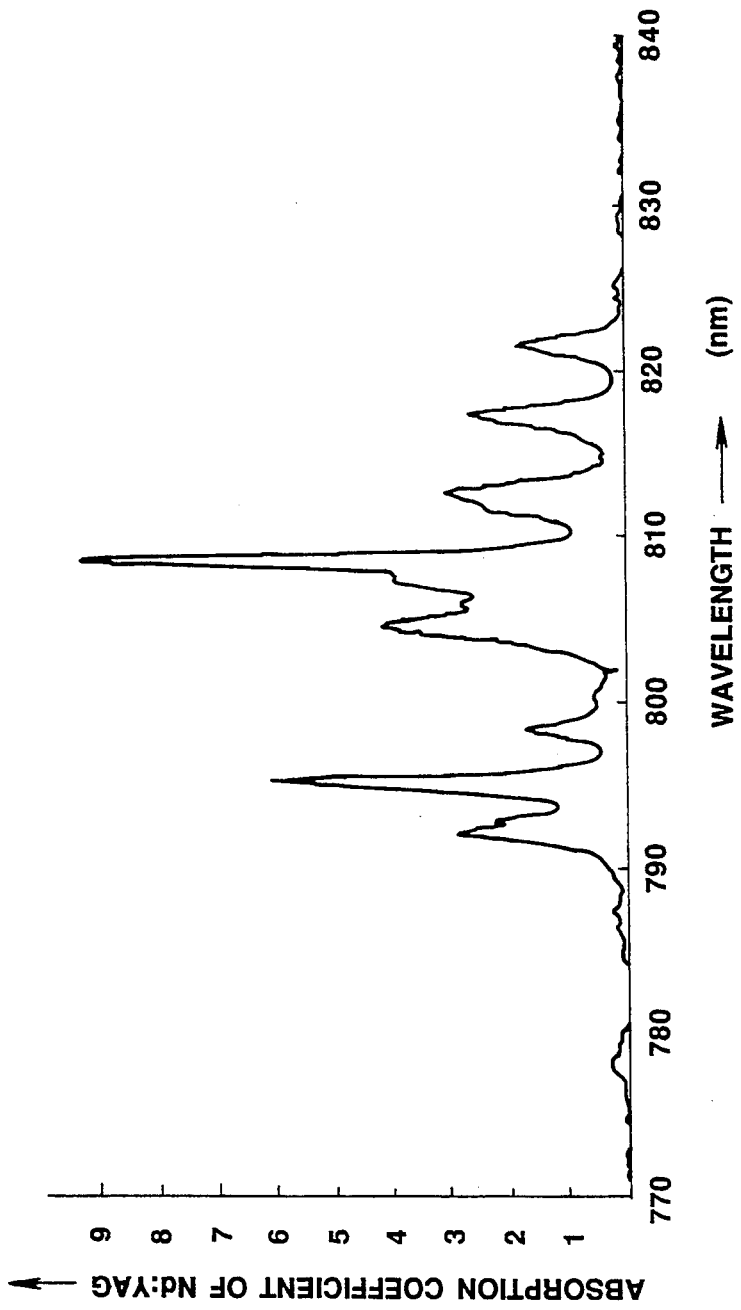
FIG. 5 is a graph showing the temperature dependence, that is, wavelength dependence of the absorption coefficient of Nd:YAG which is a laser medium.
Figure 6:
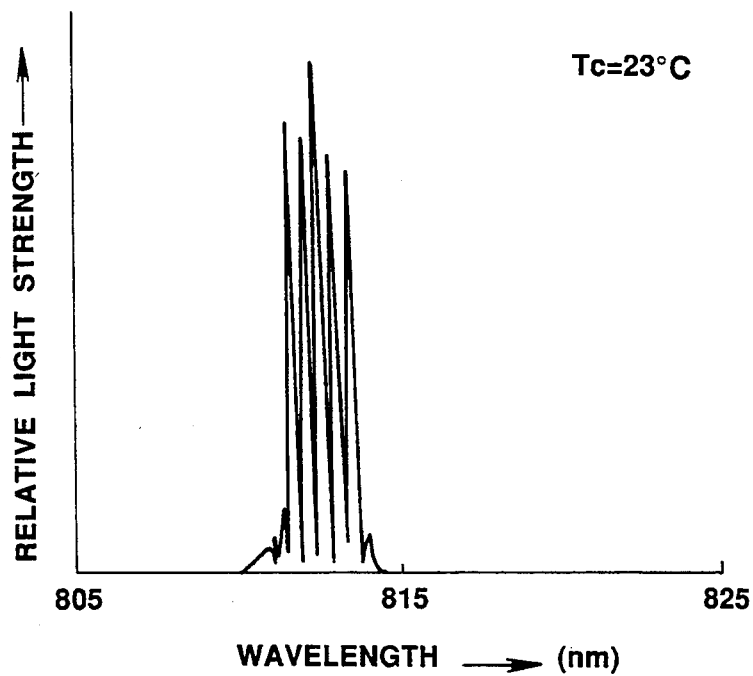
FIG. 6 is a graph showing wavelength distribution of relative light strength of a laser light beam radiated from a laser diode.
Figure 7:
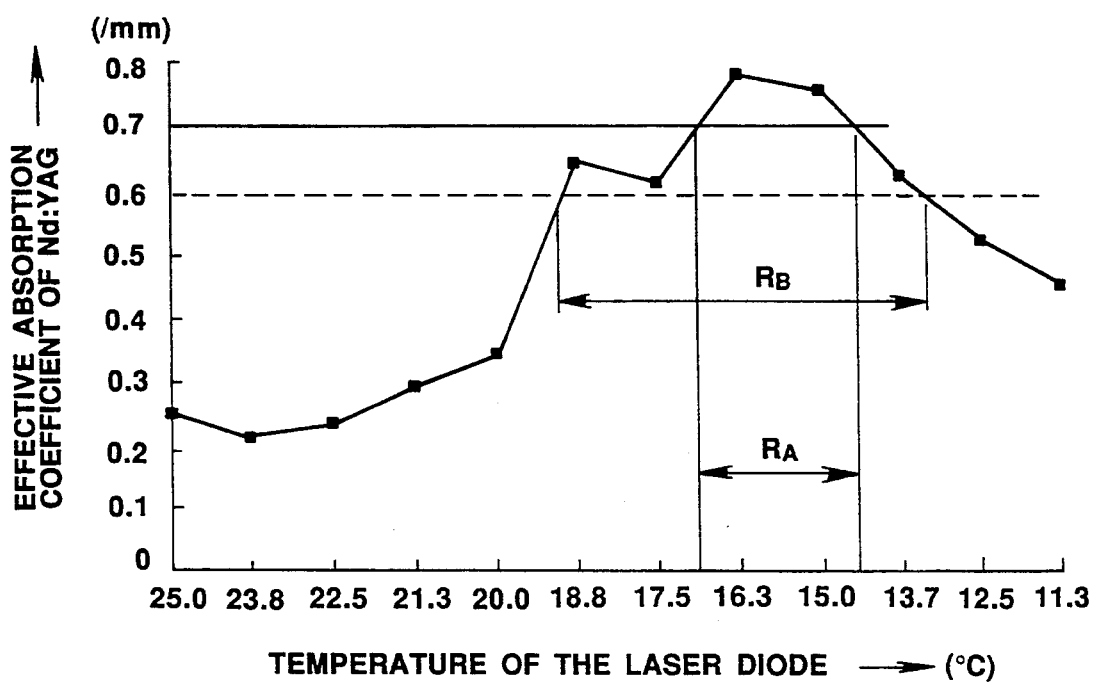
FIG. 7 is a graph showing the temperature property of the effective absorption coefficient of the pumping light beam from the laser diode into Nd:YAG.

FIG. 5 is a graph showing temperature dependence, that is, wavelength dependence of the absorption coefficient of Nd:YAG which is a solid-state laser medium. On the other hand, FIG. 6 shows a spectrum of radiation light beam strength (wavelength distribution) at the temperature of the laser diode as the semiconductor laser element being 23° C., while showing the wavelength on the horizontal axis. FIG. 7 shows the result of measuring the effective absorption coefficient of the pumping light beam absorbed in the rod-shaped Nd:YAG having the thickness of about 1 mm while varying the temperature of the laser diode. FIG. 7 shows that the temperature range RA of the laser diode is about 2.6° C. in order to obtain such efficiency that the effective absorption coefficient is 90° percent or higher of the peak. In order to have such efficiency that the effective absorption coefficient is 70 to 80 percent or higher of the peak, the temperature range RB is about 6.7° C.

In this example, though the peak efficiency is low because of the broad wavelength distribution of the laser diode as the semiconductor laser element, the allowable temperature range for maintaining efficiency higher than a predetermined level is broader than in the example of the laser diode oscillating in a single mode. The wavelength of the laser diode, even with multimode oscillation, varies at the center frequency of about 0.3 nm/K. Therefore, even when the wavelength is off the absorption line of Nd:YAG at an ambient temperature or normal temperature of, for example, 25° C., it is possible to improve absorption efficiency by varying the temperature and adjusting the wavelength to the absorption line of Nd:YAG. At this time, it is necessary that the resonator generated the SHG laser light beam perform stable operation at the temperature for the improved absorption efficiency.

By way of an example, if the laser diode is combined with the resonator 20 generating the SHG laser light beam having the stable operating temperature range of 30° C. to 35° C., it suffices to select such a laser diode emitting a laser light beam of a wavelength of approximately 809 nm (absorption line) exhibiting high absorption efficiency for Nd:YAG for this temperature range, in view of the temperature dependency of the phase delay quantity of the non-linear optical crystal device like KTP. If a laser diode, in which the center frequency is changed at a rate of approximately 0.3 nm/K along with changes in temperature, is employed, it suffices to use a laser diode having a center wavelength at 25° C. shorter by about 2.3±0.7 nm than 809 nm, in order to provide the center wavelength of approximately 809 nm at 30° C. to 35° C. A resonator having the stable operation temperature range of 30° C. to 35° C. substantially corresponds to a resonator employing KTP with the length of 2.5 mm.

On the other hand, if the temperature margin of the laser diode for the effective absorption coefficient of the rod-shaped Nd:YAG in the vicinity of the above-mentioned absorption line is on the order of ±1.3° C., it suffices to select the center wavelength of the laser diode to be approximately 806.7±1.1 nm at 25° C.

Since the temperature dependency of changes in the phase delay quantity of the non-linear optical crystal device is proportional to the crystal length, the shorter the crystal length is, the less the temperature change rate of the phase change is and hence the broader the stable temperature range becomes and the broader the wavelength margin of the laser diode becomes. In general, conventionally KTP tends to be used with its length elongated, the stable temperature range of the laser resonator becomes small in inverse proportion to the length of KTP.

Figure 8:
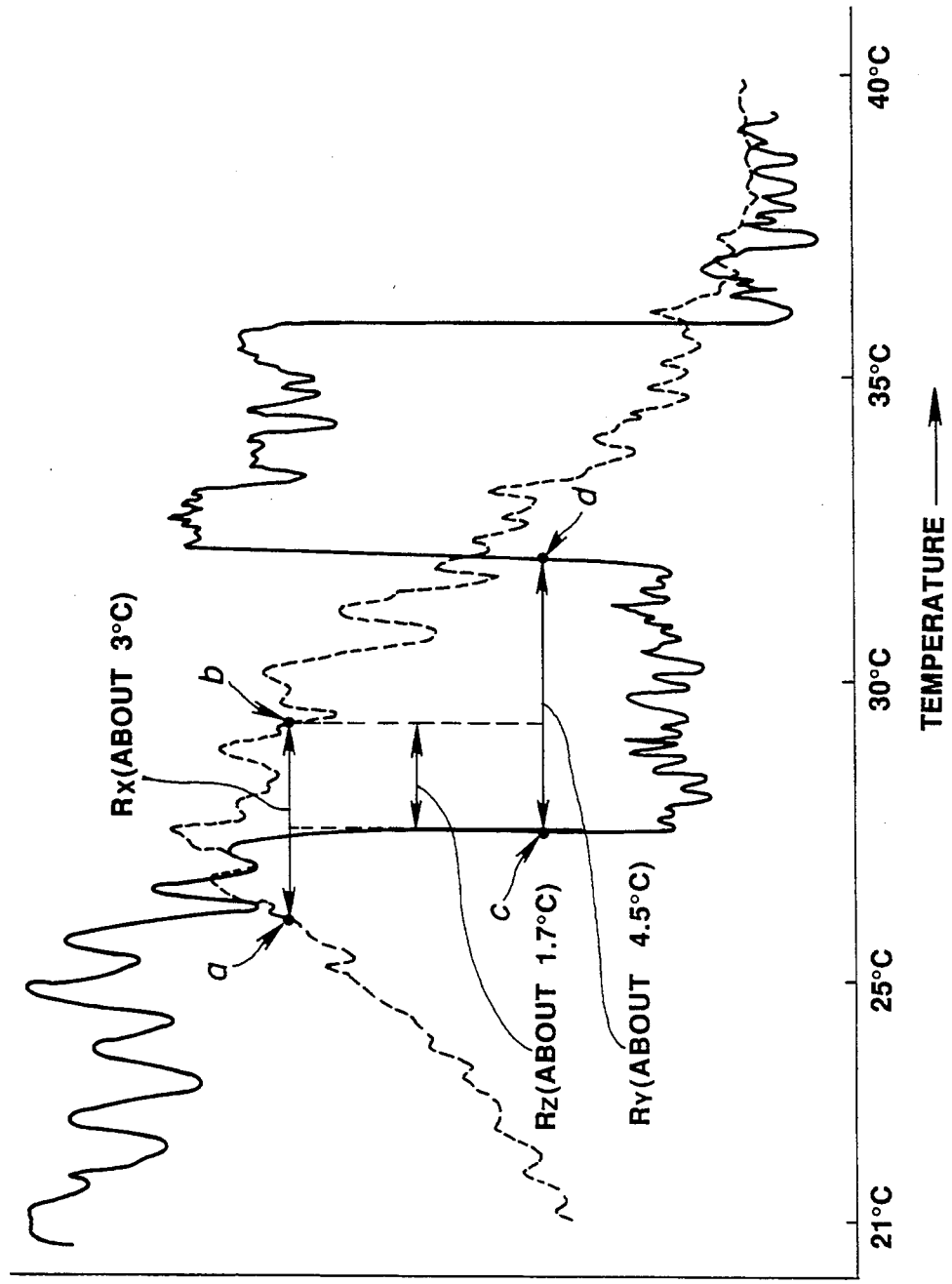
FIG. 8 is a graph showing the temperature property of the laser light beam output power and the noise level.

FIG. 8 shows the result of mounting the laser diode and the resonator generating the SHG laser light beam on the single temperature control device or the TE cooler, driving the laser diode by a constant current, and then plotting the SHG laser light beam output power shown by a dashed line and the noise level shown by a solid line with varying temperature. The output power shown by the dashed line in FIG. 8 is determined by the rate of absorption mainly of the pumping light beam of the laser diode into the Nd:YAG within the resonator, that is, the effective absorption coefficient, while the noise level shown by the solid line in FIG. 8 is determined by the operation stability of the resonator. The temperature range RX for maintaining the output power larger than 80° percent of the maximum value is about 3° C. from point a to point b, and the stable operation temperature range RY for resonator of the low noise level is about 4.5° C. from point c to point d. The duplicate range RZ from point c to point b in FIG. 8 is about 1.7° C. Accordingly, by defining this duplicate range RZ as the target temperature range for simultaneously temperature-controlling the laser diode and the resonator on the single temperature-control device, it becomes possible to obtain the stable SHG laser light beam output with high efficiency maintaining more than 80 percent of the maximum power.

Meanwhile, the laser diode having at least a part of the temperature range RX for obtaining necessary power within the stable temperature range RY from point c to point d by shifting the dashed line in a horizontal direction in FIG. 8 can be combined with the resonator having the stable temperature range RY shown by the solid line in FIG. 8. Namely, within the range satisfying the condition necessary for the laser diode capable of the single temperature control, the status of the dashed line shifted to the leftmost position is such that the right end point b of the temperature range RX reaches the left end point c of the stable temperature range RY, and the status of the dashed line shifted to the rightmost position is such that the point a reaches the right end point d of the stable temperature range RY. Instead, it is also possible to select stable temperature property of the resonator as absorption property of the laser diode, by shifting the solid line in a horizontal direction, with the dashed line fixed shown in FIG. 8.

Meanwhile, since the temperature-control device, such as the TE cooler, consumes the same or a larger amount of electric power than the laser diode as the semiconductor laser element, controlling both power securing and low noise level by the single temperature-control device contributes greatly to reduction in size and power consumption. When the laser diode and the resonator are set on separate TE coolers, there arise the problems such as difficulty in exhibiting high accuracy of relative positioning and heat expansion, due to relatively low mechanical accuracy of the TE cooler. However, such problems may be solved at a time by temperature-controlling both the laser diode and the resonator by the single TE cooler.

It is noted that the present invention is not limited to the above-described embodiments. A variety of resonators, such as a resonator provided with a concave mirror on its incident surface, may be employed. Any other laser medium or the non-linear optical crystal device than Nd:YAG or KTP may naturally be employed.

What is claimed is:

1. A laser light beam generating apparatus comprising:
    a light beam source for emitting at least one pumping light beam to a resonator spaced apart from said light beam source;
    said resonator comprising a laser medium excited by the pumping light beam from said light beam source;
    a non-linear optical crystal element arranged in an outgoing light path of the pumping light beam from said light source;
    and reflecting means disposed before said laser medium and after said non-linear optical crystal element; and
    a temperature-controlling means for controlling the temperature of said light beam source and of said resonator in response to the output of a single temperature detecting means.

2. A laser light beam generating apparatus according to claim 1, wherein said temperature-controlling means is provided under said resonator and under said light beam source.

3. A laser light beam generating apparatus according to claim 1, wherein said single temperature detecting means detects the temperature of said resonator and/or said light beam source and applies a detecting signal to said temperature-controlling means.

4. A laser light beam generating apparatus according to claim 1, wherein said apparatus further comprises a base member having at least two surfaces, wherein, said light beam source and said resonator are provided on one of the surfaces of said base member, and said temperature-controlling means is provided on another surface of said base member.

5. The laser light beam generating apparatus according to claim 1, wherein, said resonator transmits an outgoing light beam having a polarization direction perpendicular to the light beam path through the resonator.

6. The laser light beam generating apparatus according to claim 1, wherein, said resonator further comprises a quarter-wavelength plate arranged between said reflecting means disposed before said laser medium and said laser medium.

7. The laser light beam generating apparatus according to one of claims 1 or 5, wherein said resonator is mounted along a V-shaped groove on a resonator mounting block.

8. The laser light beam generating apparatus according to claim 7, further comprising a base member having at least two surfaces, wherein said light beam source and said resonator mounting block are provided on one surface of the said base member and said temperature-controlling means is provided on another surface of said base member.

9. A laser light beam generating apparatus comprising:
a light beam source for emitting at least one pumping light beam to a resonator;
said resonator comprising a laser medium excited by the pumping light beam from said light beam source;
a non-linear optical crystal element arranged in an outgoing light path of the pumping light beam from said light beam source;
and reflecting means disposed before said laser medium and after said non-linear optical crystal element;
said resonator passing an outgoing light beam from said reflecting means;
a deflecting means for deflecting a light path of the light beam outgoing from said resonator; and
a case for housing said light beam source, said resonator, and said deflecting means.

10. A laser light beam generating apparatus according to claim 9, wherein said case has means for outputting the light beam outgoing from said resonator via deflecting means.

11. A laser light beam generating apparatus according to claim 9, wherein the size of said case is equal to about 38 mm×28 mm and the height of said case is equal to about 16 mm.

12. A laser light beam generating apparatus according to claim 9, wherein said outgoing light beam from said resonator has a direction of polarization and said direction of the polarization of the light beam outgoing from said resonator is arranged in a S-polarization direction when indicent upon said deflecting means.

13. A laser light beam generating apparatus according to claim 9, wherein said apparatus further comprises a temperature-controlling means for controlling the temperature of said light beam source and of said resonator; and temperature-controlling means being provided in said case and under said resonator and under said light beam source.

14. The laser light beam generating apparatus according to claim 9, wherein, said outgoing light beam from said resonator has a polarization direction perpendicular to the light beam path through the resonator.

15. The laser light beam generating apparatus according to claim 9, wherein, said outgoing light beam from said resonator has a polarization direction perpendicular to the light beam path through the resonator and perpendicular to the light path of the beam deflected from the deflecting means.

16. The laser light beam generating apparatus according to claim 9, wherein, said resonator further comprises a quarter-wavelength plate arranged between said reflecting means disposed before said laser medium and said laser medium.

17. The laser light beam generating apparatus according to one of claims 9 or 12, wherein said resonator is mounted along a V-shaped groove on a resonator mounting block.

18. A laser light beam generating apparatus comprising:
a light beam source for emitting at least one pumping light beam to a resonator;
said resonator comprising a laser medium excited by the pumping light beam from said light beam source;
a non-linear optical crystal element arranged in an outgoing light path of the pumping light beam from said light beam source;
and reflecting means disposed before said laser medium and after said non-linear optical crystal element;
said resonator passing an outgoing light beam from said reflecting means having a direction of polarization; and
a deflecting means for deflecting a light path of the light beam outgoing from said resonator, wherein the direction of the polarization of the light beam outputted from said resonator is arranged in a S-polarization direction when incident upon said deflecting means.

19. A laser light beam generating apparatus according to claim 18, wherein said deflecting means is a deflection mirror having a tilt angle of 45° degrees.

20. A laser light beam generating apparatus according to claim 18, wherein said light beam source, said resonator, and said deflecting means are arranged coaxially.

21. The laser light beam generating apparatus according to claim 18, wherein, said polarization direction of said light beam outputted by said resonator is perpendicular to the light beam path through the resonator and is perpendicular to the light path of the beam deflected from the deflecting means.

22. The laser light beam generating apparatus according to claim 18, wherein, said resonator further comprises a quarter-wavelength plate arranged between said reflecting means disposed before said laser medium and said laser medium.

23. The laser light beam generating apparatus according to claim 18, wherein said resonator is mounted along a V-shaped groove on a resonator mounting block.

* * * * *